Nov. 21, 1939.   W. H. GRUENHAGEN   2,180,822
FISHING BAIT
Filed April 11, 1936
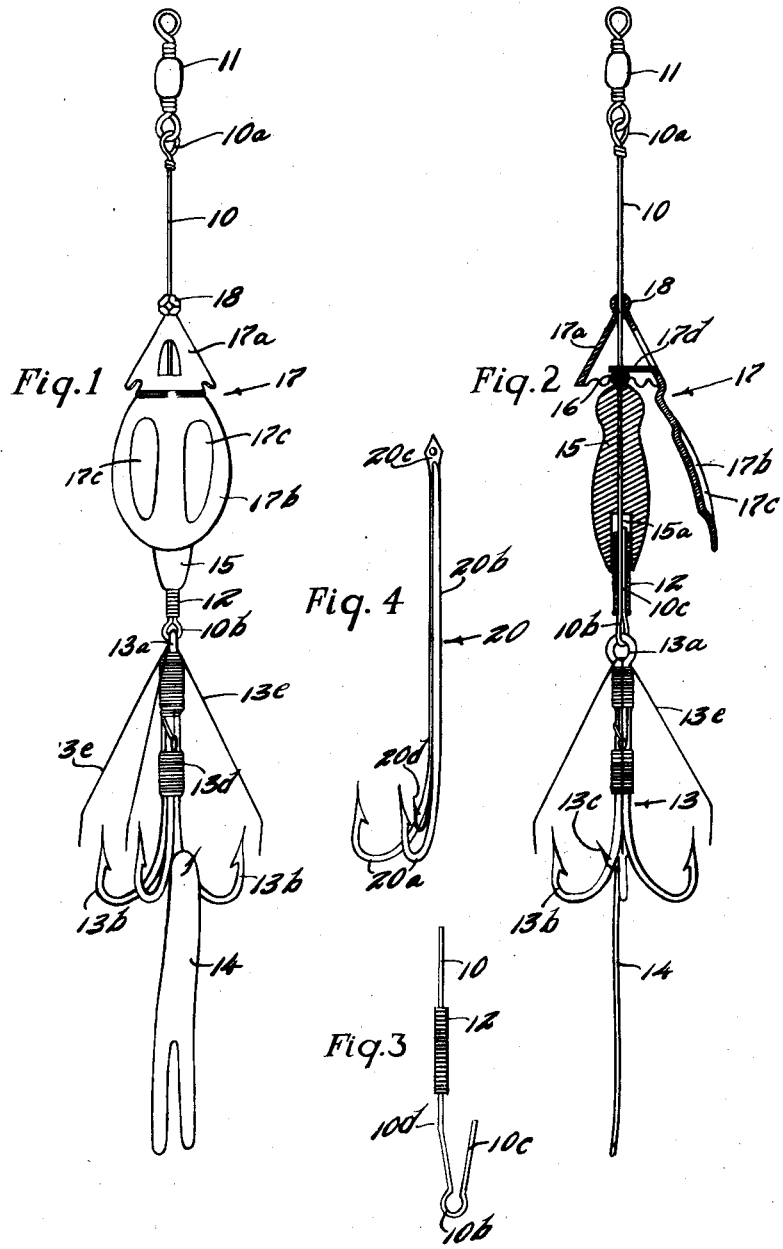
Inventor
WILLIAM H. GRUENHAGEN
By Chas. C. Reif
Attorney Patented Nov. 21, 1939

2,180,822

UNITED STATES PATENT OFFICE 2,180,822

FISHING BAIT

William H. Gruenhagen, St. Paul, Minn.

Application April 11, 1936, Serial No. 73,961

6 Claims. (Cl. 43—42)

This invention relates to a fishing bait and particularly to a bait comprising a revoluble spoon.

Spoon baits of various kinds have been previously used and it is desirable in such a bait to have a structure which will give the desired motions in the water.

It is an object of this invention to provide a revoluble spoon having a convex or conical portion at its upper end adapted to receive a shank and having an arm struck from or cut from its convex side and bent downwardly and inwardly of said portion, said arm being apertured to receive said shank.

It is a further object of the invention to provide a bait having a revoluble spoon with a conical portion at its upper end, a blade extending downwardly and outwardly from the lower end of said conical portion at one side thereof, said blade having a plurality of depressed elongated recesses in its outer side adapted to receive a different color than the rest of said blade, so as to simulate the wings of a bug.

It is a further object of the invention to provide a fishing bait comprising a shank, the lower end of said shank being reversely bent to form a hook-receiving loop, the free end of said shank being adapted to spring away from the body of said shank, means movable over said free end for holding said loop closed, said shank having means thereon for holding said means in position.

It is still another object of the invention to provide a fishing bait comprising a shank, a revoluble spoon mounted thereon, a plug below said spoon, said plug and spoon simulating a bug and a multiple hook swingingly mounted at the lower end of said shank below said plug having a hook of small size and a flexible tab carried on said last mentioned hook.

These and other objects and advantages of the invention will be fully set forth in the following description made in connection with the accompanying drawing, in which like reference characters refer to similar parts throughout the several views and in which:

Fig. 1 is a view in side elevation of the bait;

Fig. 2 is a view for the most part in vertical section taken at right angles to the plane of Fig. 1;

Fig. 3 is a partial view showing a part in a different position; and

Fig. 4 is a perspective view showing a modified form of hook.

Referring to the drawing, a fishing bait is shown comprising a shank 10. This shank is made of stiff wire which is resilient and flexible and the same is reversely bent at its upper end to form a loop 10a, the free end of said shank being shown as coiled around the stem of said shank. A swivel 11 has its lower end or loop pivotally connected in the loop 10a and the upper end of said swivel will be attached in the usual manner to a line or leader. Shank 10 at its lower end is reversely bent to form a loop 10b shown as of general circular form. The free end 10c of shank 10 normally tends to spring away from the stem of said shank as shown in Fig. 3 to open the loop 10b so that a hook may be placed therein or removed therefrom. A cylindrical member 12, illustrated as in the form of a coil of wire, surrounds the stem of shank 10 and is slidable thereon. The member 12 is adapted to receive the free end 10c and to hold the same closely against the stem of shank 10 and parallel thereto as shown in Fig. 2 to maintain the loop 10b in closed position. One part of the shank 10 is provided with an angular bend or kink 10d, which, when member 12 is passed thereover as shown in Fig. 2, exerts considerable friction on member 12 and insures that it will not move on shank 10 so as to open loop 10b.

A multiple hook 13 has an eyelet 13a engaged in loop 10b and hook 13 is shown as having three barbed hooks 13b projecting outwardly in equally spaced relation. A much smaller barbed hook 13c projects between two of the hooks 13b and some distance above the same so that it is rather close to the shanks of said hooks. A flexible tab 14 of elongated form has its upper rounded end engaged over hook 13c and depends from the hook 13. Tab 14 is shown as having a divided lower end. This tab will be made of comparatively thin white felt, leather or rubber. The shanks of hooks 13b and 13c are illustrated as wrapped together by thin wire 13d which preferably will be soldered after being wound about said shanks. Stiff wires 13e extend from eyelet 13a downwardly and outwardly to adjacent the ends of hooks 13b and are then bent to extend substantially parallel to the ends of said hooks. These wires form weed guards for hooks 13b.

Above member 12 on shank 10 is a plug 15 of comparatively small diameter, the same having a semi-spherical upper end and a tapering lower end. Said plug has a groove thereabout adjacent its upper end and is provided with a central bore or opening through which shank 10 passes. Said bore is enlarged to form a recess 15a at its lower portion adapted to receive the upper end of member 12. An apertured bead 16 of metal or glass surrounds shank 10 above plug 15. A spoon 17 is provided having an upper conical end 17a centrally apertured at its top to receive shank 10. A blade 17b extends downwardly and outwardly from the lower end of conical portion 17a and at one side thereof, said blade having a general elliptical form and having a plurality of depressed elongated recesses 17c at its outer side. An arm 17d is cut or struck from one side of portion 17a, said arm being bent downwardly and inwardly and being apertured adjacent its end for the passage of shank 10. Arm 17d is spaced from the top of conical portion 17a and the aperture therein and the spoon 17 is thus held in position on shank 10. The lower edge of portion 17a is shown as scalloped and blade 17b is shown as offset inwardly at its upper end from the edge of portion 17a. A bead 18 centrally apertured to receive shank 10 is disposed above spoon 17.

In Fig. 4, a modified form of multiple hook 20 is shown. This hook comprises a pair of barbed hooks 20a having unusually long shanks 20b disposed in contact and in parallel relation and soldered together. An apertured point 20c is disposed at the free ends of said shanks. A much smaller hook 20d also has its shank extending along and soldered to the shanks 20b. The curved and barbed end of hook 20d is adjacent the shanks 20b and between the hooks 20a.

In operation, the bait will be connected to the fishing line in the usual way and will be drawn through the water. The water engages the spoon 17 and causes rotation thereof. Owing to the fact that arm 17d is bent downwardly and inwardly an opening is left in the side of conical portion 17a so that water can pass through this opening. This considerably lessens the resistance of the spoon to the water and makes possible a quicker rotation of spoon 17 for a given linear speed through the water. At the same time a simple and effective support is formed by arm 17d. In practice the grooves or recesses 17c will be colored in a different color from the remainder of the spoon. These grooves are usually colored red or black while the remainder of the outer side of the spoon is polished nickel, yellow or white. The plug 15 is usually colored red or its lower part is white and its upper part red. The plug 15 simulates the body of a bug or insect. The plug 15 has the spoon 17 in transverse alinement therewith and as this spoon revolves it simulates the wings of a bug or insect. This is particularly true since the grooves 17c are provided having the general shape of the wings of a bug. When the spoon is revolving in the water the effect of a flying or fluttering bug is produced.

When a different hook is to be used spoon 17 and plug 15 are moved upwardly and member 12 is moved upwardly on shank 10 out of engagement with end 10c. Said end then springs outward as shown in Fig. 3 and the hook can be removed and another put in place. Afterwards this member 12 is again moved downwardly over portion 10c and held in place by friction of the bend or kink 10d. The tab 14 is very alluring to the fish as the bait is drawn through the water and the fish striking is caught on the hooks 13b.

When hook 20 is used bait is used therewith, such as a minnow. The hook can be inserted lengthwise of the minnow and the hook 20d inserted in the side of the minnow to hold the same from slipping downward or backward on hook 20. The pointed end 20c facilitates the placing of the hook through the minnow. Obviously a frog could be similarly held.

From the above description it is seen that applicant has produced a simple and very efficient bait. The same has been amply demonstrated in actual practice and is being commercially made. It is easily assembled and the hook can be changed as desired.

It will, of course, be understood that various changes may be made in the form, details, arrangement and proportions of the parts, without departing from the scope of applicant's invention, which generally stated, consists in a device capable of carrying out the objects above set forth in the parts and combinations of parts disclosed and defined in the appended claims.

What is claimed is:

1. A fishing bait comprising a spoon having a conical portion at its upper end and a blade depending downwardly and outwardly from one side thereof, said portion having a central opening at its upper end, a shank disposed in said opening, said conical portion having an arm cut therefrom and bent downwardly and inwardly, said arm being apertured to receive said shank and being spaced from said first mentioned opening and means on said shank for supporting said arm and spoon.

2. A fishing bait comprising a shank, a spoon revolubly mounted on said shank comprising a conical upper portion and a spoon-shaped blade extending downwardly and outwardly from the bottom of said portion at one side thereof, said blade being offset from said conical portion and having a plurality of depressed recesses in its outer surface of a different color adapted to simulate the wings of a bug.

3. A fishing bait comprising a shank, a spoon revolubly mounted on said shank comprising a conical upper portion and a spoon-shaped blade extending downwardly and outwardly from the bottom of said portion at one side thereof and a plug having a rounded head and a reduced portion below said head centrally mounted on said shank and having an elongated portion in transverse alinement with said spoon, said plug and spoon being adapted to simulate the body and wings of a bug respectively.

4. A fishing bait comprising a shank, a spoon revolubly mounted on said shank comprising a conical upper portion and a spoon-shaped blade extending downwardly and outwardly from the bottom of said portion at one side thereof, said blade having spaced elongated and tapering portions in its outer surface at a different elevation than the rest of said surface and adapted to be colored differently from the rest of said surface to simulate the wings of a bug.

5. A fishing bait comprising a shank, a spoon revolubly mounted on said shank comprising a conical upper portion and a spoon-shaped blade extending downwardly and outwardly from the bottom of said portion at one side thereof, a plug centrally mounted on said shank below said conical portion and in transverse alinement with said blade, said plug having a semi-spherical upper portion, a narrow portion below said portion and an elongated tapered portion below said narrow portion.

6. The structure set forth in claim 5, said shank having a loop at its lower end and a holding means for said loop, said plug having a recess in its lower end into which said holding means is movable.

WILLIAM H. GRUENHAGEN.